United States Patent
Li

(10) Patent No.: US 11,775,075 B2
(45) Date of Patent: *Oct. 3, 2023

(54) HEAD AND EYE-BASED GESTURE RECOGNITION

(71) Applicant: NextSense, Inc., Mountain View, CA (US)

(72) Inventor: Richard Li, Los Altos, CA (US)

(73) Assignee: NextSense, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/447,403

(22) Filed: Sep. 10, 2021

(65) Prior Publication Data

US 2022/0276717 A1    Sep. 1, 2022

Related U.S. Application Data

(63) Continuation of application No. 16/595,634, filed on Oct. 8, 2019, now Pat. No. 11,119,580.

(51) Int. Cl.
| | |
|---|---|
| *G06F 3/01* | (2006.01) |
| *G06F 1/16* | (2006.01) |
| *G06F 3/0346* | (2013.01) |
| *G06V 40/20* | (2022.01) |

(52) U.S. Cl.
CPC .............. *G06F 3/017* (2013.01); *G06F 1/163* (2013.01); *G06F 3/012* (2013.01); *G06F 3/013* (2013.01); *G06F 3/0346* (2013.01); *G06V 40/20* (2022.01)

(58) Field of Classification Search
CPC .......... G06F 3/017; G06F 1/163; G06F 3/012; G06F 3/013; G06F 3/0346; G06V 40/20
See application file for complete search history.

(56) References Cited

U.S. PATENT DOCUMENTS

| | | | | |
|---|---|---|---|---|
| 9,207,760 | B1 * | 12/2015 | Wu | ..................... G06F 18/2113 |
| 11,119,580 | B2 * | 9/2021 | Li | ........................... G06F 1/163 |
| 2004/0070729 | A1 | 4/2004 | Wiebe et al. | |

(Continued)

OTHER PUBLICATIONS

Esteves, et al "Orbits: Gaze Interaction for Smart Watches, using Smooth Pursuit Eye Movements" '15, November 088-11, 2015, Charlotte, NC, USA., 10 Pages.

(Continued)

*Primary Examiner* — Mihir K Rayan
(74) *Attorney, Agent, or Firm* — Perkins Coie LLP

(57) ABSTRACT

Aspects of the disclosure relate to identifying and utilizing head and eye gestures, using a wearable computing device. The wearable computing device may include an electrooculography electrode configured to provide first feedback to one or more processors as well as an inertial measurement unit configured to provide second feedback to the one or more processors. The first feedback may correspond to eye movement, and the second feedback may correspond to head movement. The wearable computing device may also include the one or more processors which may be configured to use the first feedback and these second feedback to determine whether the head movement and eye movement correspond to a trigger for an action as well as to cause the wearable computing device to perform the action based on the determination.

20 Claims, 5 Drawing Sheets

(56) References Cited

U.S. PATENT DOCUMENTS

| | | | | |
|---|---|---|---|---|
| 2012/0179636 A1* | 7/2012 | Galiana | ................ | A61B 5/7264 |
| | | | | 706/14 |
| 2015/0126845 A1 | 5/2015 | Jin et al. | | |
| 2015/0212576 A1* | 7/2015 | Ambrus | ................ | G06F 3/0482 |
| | | | | 345/156 |
| 2016/0007849 A1* | 1/2016 | Krueger | ................... | A61B 5/11 |
| | | | | 600/301 |
| 2016/0216760 A1* | 7/2016 | Trutna | .................... | G06F 3/012 |
| 2016/0235323 A1* | 8/2016 | Tadi | ..................... | A61B 5/1128 |
| 2017/0039045 A1 | 2/2017 | Abraham et al. | | |
| 2017/0123215 A1* | 5/2017 | Li | ........................... | G06F 3/038 |
| 2018/0254019 A1 | 9/2018 | Raffle et al. | | |
| 2018/0299953 A1* | 10/2018 | Selker | .................. | G06T 19/006 |

OTHER PUBLICATIONS

International Search Report and Written Opinion for Application No. PCT/US2020/034902 dated Aug. 25, 2020.

\* cited by examiner

HEAD AND EYE-BASED GESTURE RECOGNITION

CROSS-REFERENCE TO RELATED APPLICATION(S)

This application is a continuation of U.S. application Ser. No. 16/595,634, filed Oct. 8, 2019, entitled "HEAD AND EYE-BASED GESTURE RECOGNITION," the disclosure of which is hereby incorporated by reference herein in its entirety.

BACKGROUND

Computing devices such as personal computers, laptop computers, tablet computers, cellular phones, and countless types of Internet-capable devices are increasingly prevalent in numerous aspects of modem life. As computing devices become more pervasive, both by being on-body and in-the-environment, controlling these devices demands more natural ways of interaction. Common human gestures are often proposed as natural interactions, but are significantly prone to false positives. For example, using a "smiling gesture" to trigger turning on the lights, can result in unwanted triggers due to the person smiling naturally in context. On the other hand, more complex gestures such as moving fingers in different patterns of motion may have better recognition performance, but be too difficult for people to remember or even perform properly as they are not natural movements. In reality, many gestures which work well in a lab setting are less than ideal for general use. In other words, gestures need to be distinct enough for a computing device to recognize as well as easy for people to remember and perform.

BRIEF SUMMARY (The aspect of the disclosure provides a system for identifying and utilizing head and eye gestures. The system includes a wearable computing device having an electrooculography electrode configured to provide first feedback to one or more processors. The first feedback corresponds to eye movement. The system also includes an inertial measurement unit configured to provide second feedback to the one or more processors. The second feedback corresponds to head movement. The system also includes one or more processors configured to use the first feedback and the second feedback to determine whether the head movement and eye movement correspond to a trigger for an action and cause the wearable computing device to perform the action based on the determination.

In one example, wherein the wearable computing device includes a nose pad, and wherein the electroculography electrode is arranged at the nose pad. In another example, the wearable computing device includes one or more side support arms, and the inertial measurement unit is arranged at one of the one or more side support arms. In another example, the inertial measurement unit is a gyroscope. In another example, the trigger corresponds to a vestibulo-ocular reflex. In another example, the system also includes memory storing a first classifier configured to be used to determine whether the head movement and eye movement corresponds to the trigger. In this example, determining whether the head movement and eye movement correspond to the trigger includes generating values using the first feedback and the one or more processors are further configured to input the values into the first classifier to determine whether the head movement and eye movement correspond to the trigger. In addition or alternatively, the memory further stores a second classifier configured to be used to identify a type of gesture associated with the action. In this example, the one or more processors are further configured to, based on the determination, input the values into the second classifier in order to identify the type of gesture.

Another aspect of the disclosure provides a method for identifying and utilizing head and eye gestures. The method includes receiving, by one or more processors of a wearable computing device, first feedback corresponding to eye movement from an electrooculography electrode, the electrooculography electrode being part of the wearable computing device; receiving, by the one or more processors, second feedback corresponding to head movement from an inertial measurement unit, the inertial measurement unit being part of the wearable computing device; using, by the one or more processors, the first feedback and the second feedback to determine whether the head movement and eye movement correspond to a trigger for an action; and causing, by the one or more processors, the wearable computing device to perform the action based on the determination.

In one example, the trigger corresponds to a vestibulo-ocular reflex. In another example, determining whether the head movement and eye movement correspond to the trigger includes generating values using the first feedback and inputting the values into a classifier that outputs an indication of whether the head movement and eye movement correspond to the trigger. In this example, the values include a Pearson correlation between the first feedback and the second feedback. In addition or alternatively, generating the values includes using a sliding window approach on the first feedback. In addition or alternatively, the method also includes, based on the determination, inputting the values into a second classifier in order to identify a type of gesture, and wherein the type of gesture is associated with the action. In another example, determining whether the head movement and eye movement correspond to the trigger includes generating second values using the second feedback and inputting the second values into a classifier that outputs an indication of whether the head movement and eye movement correspond to the trigger. In this example, the values include a Pearson correlation between the first feedback and the second feedback. In addition or alternatively, generating the values includes using a sliding window approach on the second feedback. In addition or alternatively, the method also includes, based on the determination, inputting the values into a second classifier in order to identify a type of gesture, and wherein the type of gesture is associated with the action. In another example, the inertial measurement unit is a gyroscope.

DETAILED DESCRIPTION

Overview

Figure 1:
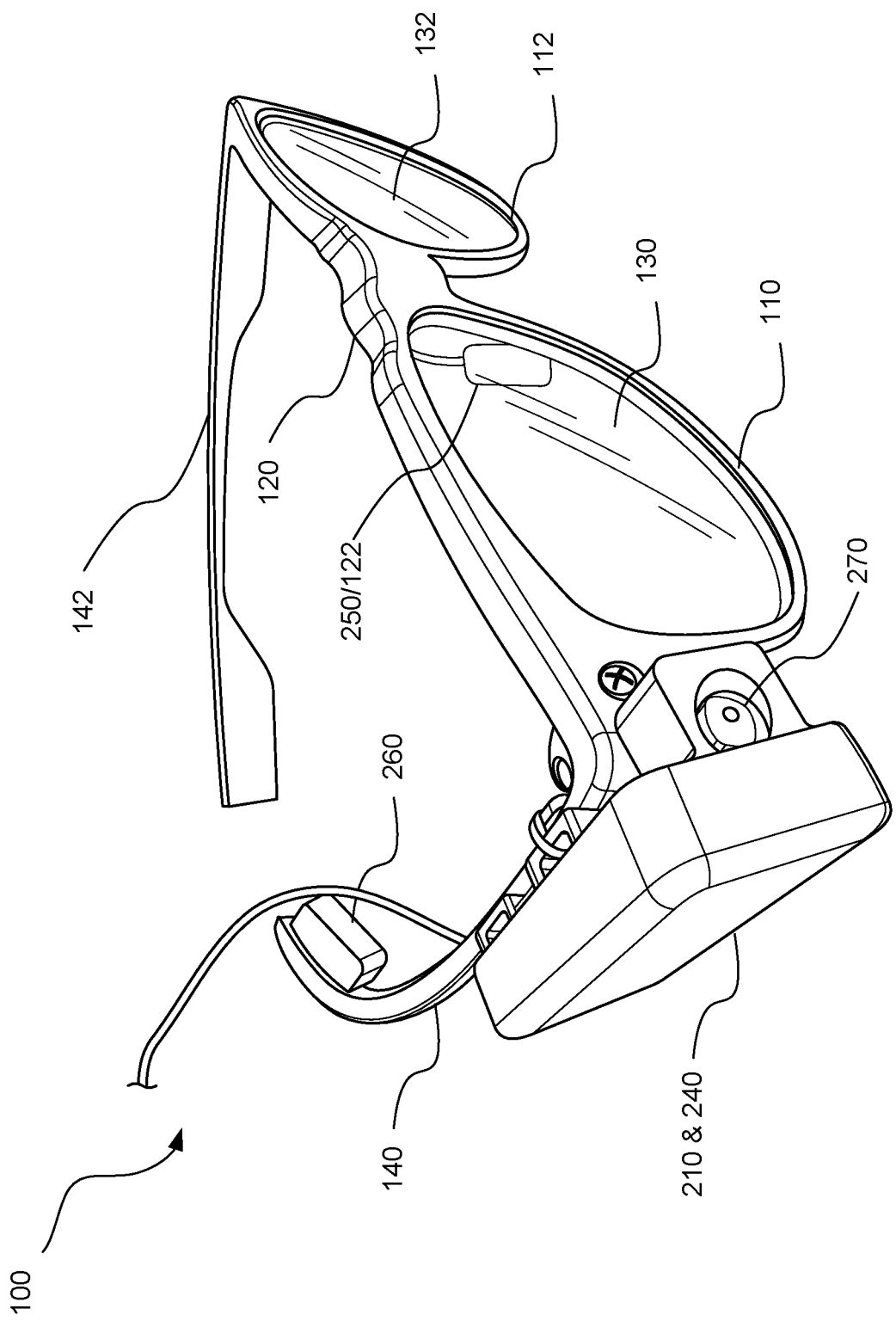
FIG. 1 is an example of a wearable computing device in accordance with aspects of the disclosure.

The present disclosure generally relates to identifying and utilizing head and eye gestures. Human eyes move in four ways: saccades, smooth pursuits, vergences, and vestibulo-ocular reflex (VOR). This VOR may be leveraged as an indicator of visual attention in order to initiate and identify gestures and associated commands. During this reflexive state, the human eye naturally compensates for movements in the head by rotating in a complementary way. For instance, when a person fixes their focus on a point while moving his or her head, there is a strong negative correlation between head rotation and eye position. This correlation can then serve as a platform for a number of head-based gestures.

One implementation may include a wearable computing device, such as a device that can be worn on the face. The wearable computing device may include a pair of glasses with lens frames, one or more of the aforementioned displays, a center frame support, lenses, and side support arms. The wearable computing device may also include a battery, memory, processing hardware, as well as a plurality of sensors. One of the sensors may include electrooculography (EOG) electrodes which measures eye movement and provides feedback to the processing hardware. Another of the sensors may include an inertial measurement unit (IMU), such as a gyroscope, which tracks head rotation and provides feedback to the processing hardware.

The EOG and IMU feedback can be used as a trigger to identify possible gestures. A first classifier may be used to determine whether the feedback from the EOG and the IMU correspond to a trigger for a gesture. As noted above, if a person focuses on a point with his or her eyes while moving his or her head in different directions, the feedback will be out of phase. This may correspond to a trigger for a gesture. If the first classifier indicates that the feedback indicates a trigger, a second classifier may be used to determine a type of gesture being performed. Again, the values including the Pearson correlation may then be input into a second classifier to identify a particular gesture. A gesture may be associated with a corresponding command or action, and once the action is identified, the wearable computing device may perform that action.

The features described herein may provide ways to recognize gestures and commands while using very little computing resources. In addition, the features described herein may significantly decrease the probability of false positives, reduces power consumption and is faster at recognizing gestures than camera-based approaches to recognizing gestures such as those that would require an internal-facing camera for recognizing electrooculography which can have high battery costs. Other efforts to investigate gaze-based gestures, focus on the idea of synchronizing eye movements to a moving stimulus. In this case, the eye is moving in a smooth pursuits fashion. However, for a typical person, leveraging the VOR requires less mental load than the smooth pursuits due to the reflexive nature of VOR.

Example Device

One implementation may include a wearable computing device, such as a device that can be worn on the face. For instance, FIG. 1 depicts an example wearable computing device 100, here depicted as a pair of "smart" glasses. The wearable computing device may include a pair of glasses with lens frames 110, 112, a center frame support 120, lenses 130, 132, and side support arms 140, 142 that can be positioned over the wearer's ears. Although not depicted in the example, the wearable computing device may also include a near-eye display, head-mounted display (HMD), or heads-up display (HUD). Alternatively, rather than a pair of glasses, the wearable computing device may include other types of head-mounted devices such as an earbud or those that include a front frame support, one or more of the aforementioned displays, and side support arms without lenses.

Figure 2:
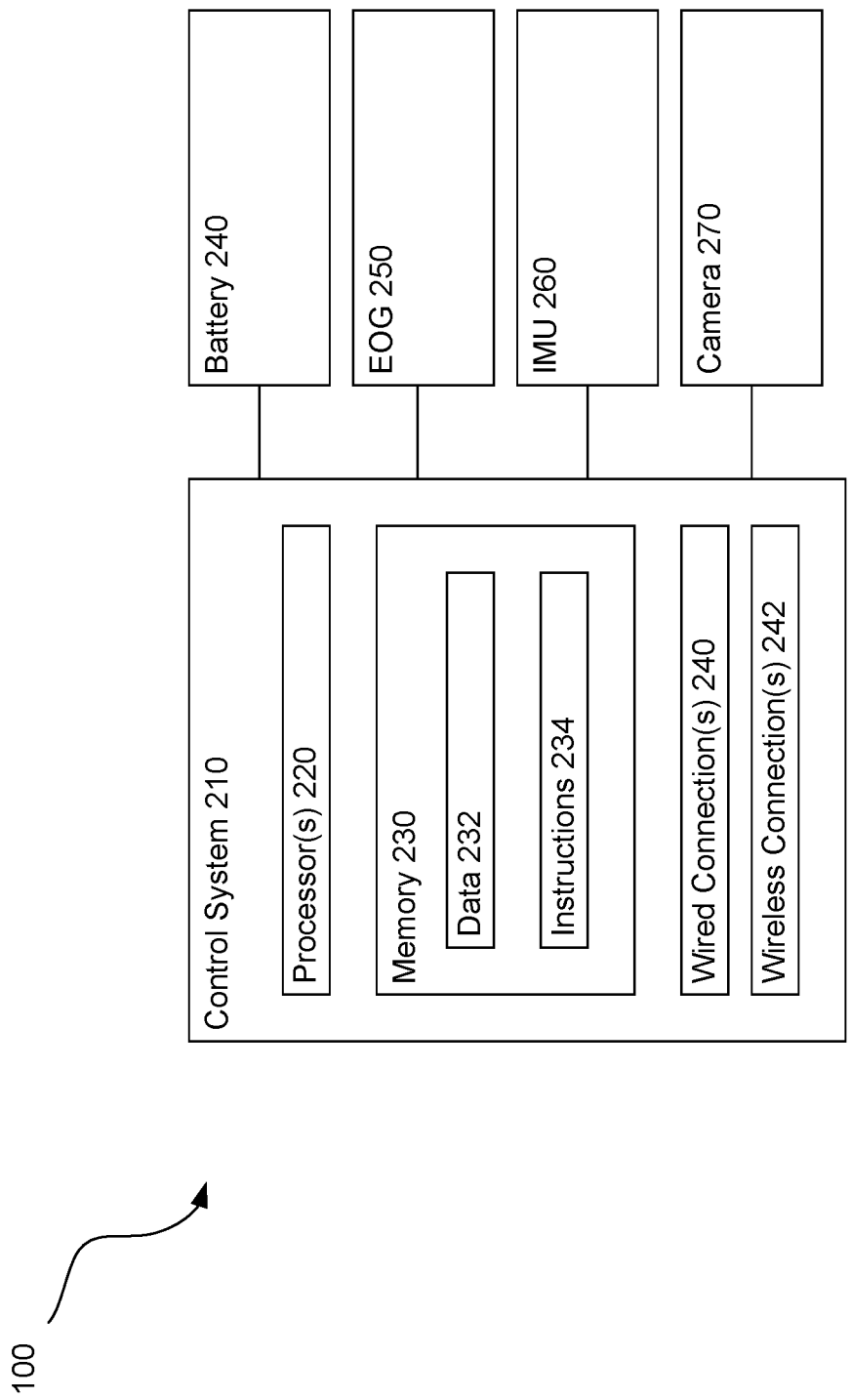
FIG. 2 is an example block diagram of a wearable computing device in accordance with aspects of the disclosure.

FIG. 2 depicts a block diagram of the wearable computing device 100. In this example, the wearable computing device 100 includes processing hardware 210 including the one or more processors 220, memory 230 storing instructions 230 and data 232, a battery 240, a plurality of sensors (including EOG 250 and IMU 260), as well as a camera 270. One of the sensors may include electrooculography (EOG) electrodes or EOG 250 which measures eye movement and provides feedback to the processing hardware 210. As an example, these electrodes may be attached to or mounted within a nose pad 122 extending from the center frame support 120 of the wearable computing device. Another of the sensors may include an inertial measurement unit (IMU) or IMU 260, such as a gyroscope, which tracks head rotation and provides feedback to the processing hardware 210. As an example, the IMU may be attached to or mounted within side support arm 140 as shown, or alternatively, side support arm 142. In the example of an earbud, the EOG and IMU may each be located on various portions of the earbud as eye movement may still be detectable at or around a person's ears as the electrical signals detected by the EOG may propagate throughout the head. For instance, the EOG may measure electrical signals from a person's ear canal.

The memory 230 stores information accessible by the processors 220, including instructions 232 and data 234 that may be executed or otherwise used by the processors 220. The memory 230 may be of any type capable of storing information accessible by the one or more processors, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 232 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 234 may be retrieved, stored or modified by the one or more processors 930 in accordance with the instructions 234. For instance, although the claimed subject matter is not limited by any particular data structure, the data may be stored in computing device registers, in a relational database as a table having a plurality of different fields and records, XML documents or flat files. The data may also be formatted in any computing device-readable format. For instance, data may store information about the expected location of the sun relative to the earth at any given point in time as well as information about the location of network targets.

The processors 220 may be any conventional processors, such as commercially available CPUs or GPUs. Alternatively, the one or more processors may be a dedicated device such as an ASIC or other hardware-based processor. Although FIG. 2 functionally illustrates the processor 220, memory 230, and other elements of the processing hardware 210 as being within the same block, it will be understood that the processors or memory may actually include multiple processors or memories that may or may not be stored within the same physical housing. For example, memory may be a hard drive or other storage media located in a housing different from that of the processing hardware 210.

The processing hardware may also include one or more wired connections 240 and wireless connections 242 (such as transmitters/receivers) to facilitate communication with the sensors and/or a remote computing device.

Example Methods

Figure 3:
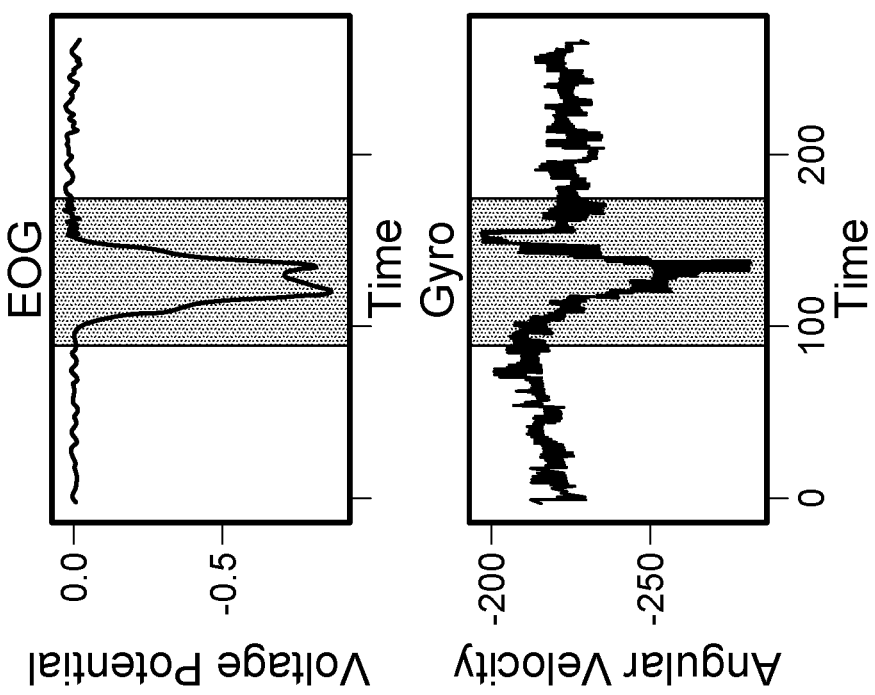
FIG. 3 is an example comparison of data in accordance with aspects of the disclosure.

FIG. 3 provides an example comparison of EOG and IMU (here, a gyroscope) feedback under saccadic eye movement as a person looks around while moving his or her head. For instance, the person may be looking off to one side while turning his or her head in the same direction and back. In this example, eye movement is measured in voltage potential, and head movement is measured in angular velocity. As can be seen, there is some small latency in the head movement detected by the gyroscope as compared to the eye movement detected by the EOG, because the eyes will move slightly ahead of the head. In other words, eye movement and head movement are roughly in the same direction. As such, the signals from the feedback (or rather, the voltage potential and angular velocity) are (correlated and in phase.

Figure 4:
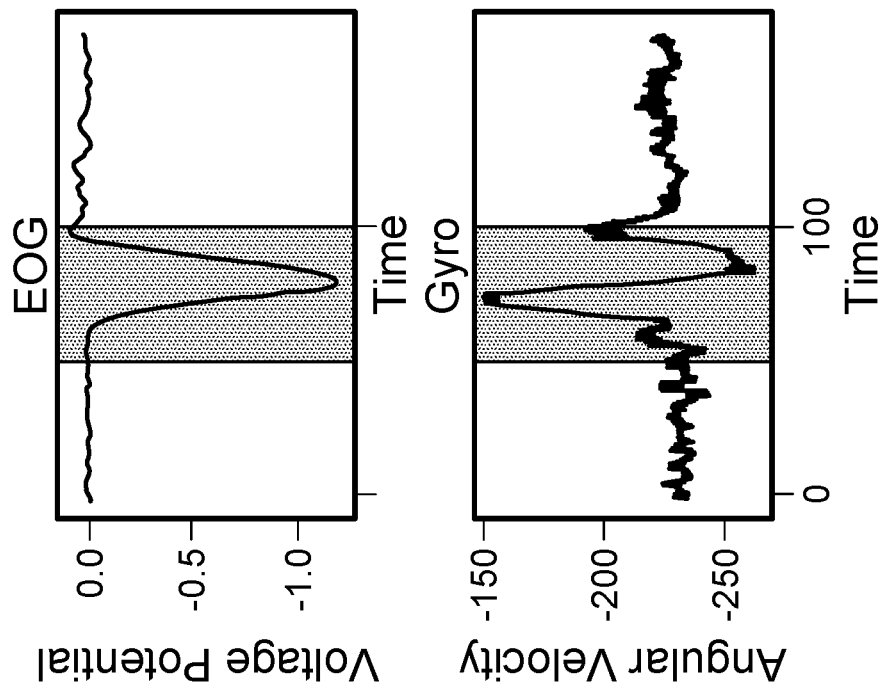
FIG. 4 is an example comparison of data in accordance with aspects of the disclosure.

FIG. 4 provides an example comparison of EOG and IMU (here, a gyroscope) feedback under VOR eye movement as a person looks around while moving his or her head. For instance, the person may be focused on a point while he or she turns his or her head in a particular direction (left or right) and back. In other words, eye movement and head movement are roughly in the opposite directions. As such, the signals from the feedback (or rather, the voltage potential and angular velocity) are uncorrelated and out of phase.

Figure 5:
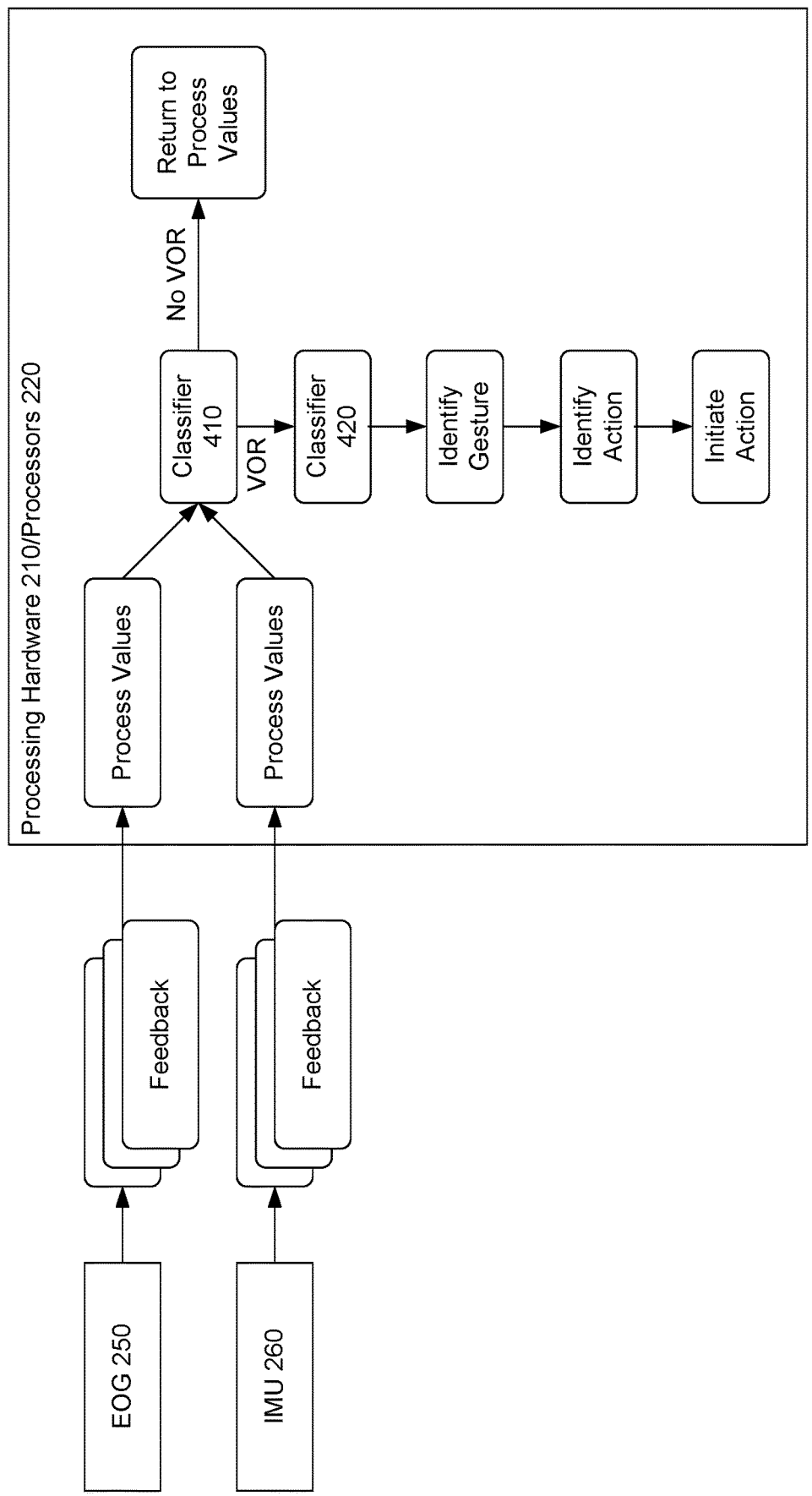
FIG. 5 is an example block diagram of identifying and utilizing head and eye gestures in accordance with aspects of the disclosure.

This out of phase relationship between the EOG and IMU feedback can be used as a trigger to identify possible gestures. FIG. 5 represents an example block diagram of identifying and utilizing head and eye gestures. For instance, the feedback from the EOG 250 and IMU 260 may be sent to the processing hardware 210. The processors 220 may then process the feedback using a sliding window approach to determine a plurality of values. As an example, the window size may include 100 data points, and may "slide" 5 data points. The feedback within a window may be processed to identify the plurality of values including, for instance, maximum value for a window, minimum value for a window, range for a window, and mean for that window. In addition, the feedback from each window may also be compared in order to determine a Pearson correlation for each window. Other values such as cross correlation (as an indicator of phase shift) as well as the delta peak timing for the EOG and IMU feedback may also be determined. The delta peak timing may be determined by finding the maximum and/or minimum (e.g. a peak of the feedback) values of the feedback within a window. If the peak is not at the beginning or start of a window, the delta peak timing may be determined from the difference between the timestamps of the peak in the EOG feedback and of the peak in the IMU feedback.

The plurality of values, including the Pearson correlation as well as the other values, may then be input into a first classifier 410 in order to determine whether the feedback from the EOG 250 and the IMU 260 correspond to a trigger for a gesture. As noted above, if a person focuses on a point with his or her eyes while moving his or her head in different directions, the feedback between the EOG 250 and the IMU 260 will be out of phase. This out of phase determination may correspond to a trigger for a gesture. In this regard, the classifier 410 may identify whether the feedback (or rather, the plurality of values) indicates that the movement corresponded to a VOR or not to a VOR. As an example, the classifier 420 may output an indication, such as a binary value, such as 0 or 1, corresponding to one or the other of a VOR or not a VOR. In other words, the output may indicate whether the eye and head movements correspond to a trigger for a gesture. If the classifier 410 determines that the values do not correspond to a VOR, the processors 220 may continue to process additional values from additional windows. In addition, the classifier 410 may be a decision tree, random forest classifier, or other model which can be used to identify whether the feedback indicates a trigger based on the magnitude of the eye and head movement in addition to how uncorrelated the feedback is.

If the first classifier indicates that the feedback indicates a trigger, a second classifier 420 may be used to determine a type of gesture being performed. Again, the plurality of values, including the Pearson correlation, may then be input into the classifier 420 in order to identify a particular gesture. The classifier 420 may be a decision tree, random forest classifier, or other model which can be used to identify specific gestures. As an example, the classifier 420 may output an indication corresponding to an identifier for a particular gesture. In some instances, the classifier 410 may be used to "segment" the data or finding a window of data where a gesture exists. Thereafter, the classifier 420, which may be a more sophisticated classifier, may be used to recognize a plurality of gestures. For example, the classifier 420 may utilize dynamic time warp (DTW) or structural empirical cumulative distribution function (sECDF) features, to recognize a plurality of gestures to a high degree of accuracy.

Each of these identifiers for a gesture may be associated with a corresponding command or action in a lookup table, database or other storage structure stored in the memory 230. Examples of actions may include controlling devices, capturing images or controlling aspects or features of the wearable computing device, requesting an online (e.g. via the internet) search for visually similar images or an object or type of object that appears in the visual field of view, generate a flag or bookmark on an object of interest in the visual field of view, build a social interaction on top of an object in the visual field of view, etc. Once the action is identified, the wearable computing device may perform that action. Example gestures may include turning the head left then right (e.g. to return to center), turning the head right then left (e.g. to return to center), moving the head up then down, moving the head down then up, moving the head in a clockwise circle, moving the head in a counterclockwise circle, etc.

As an example implementation of the aforementioned features, a person may see a poster of interest and want to take notes on it. Instead of pulling out his or her smartphone, finding the notes app, and typing in the relevant details, while wearing the wearable computing device 100, he or she can simply visually focus on the poster and tilt his or her head to the left and back to the center. The feedback from the EOG 250 and IMU 260 would be uncorrelated or rather, completely out of phase. As such, the wearable computing device 100 may use the classifier 410 to determine that the person's VOR is engaged and that the eye and head movements correspond to a trigger for a gesture. Then, the wearable computing device 100 may use the second classifier to determine that during the reflex, a "tilt-left" gesture was performed. The wearable computing device 100 may then identify an action such as "turn on" or "turn off" based on the gesture and may automatically send an instruction to a remote device in order to turn on or turn off a light (e.g. a lamp) or other IoT (Internet of Things) device at or near the location of the point of interest. This thus simplifies the process of controlling the device, and enables the person to accomplish an otherwise complex task (e.g. turning on or off a light) much more efficiently.

In some instances, the sensors, such as the EOG 250 and IMU 260, need not actually turn on and record sensor data or feedback until some kind of condition is met. For instance, the IMU 260 need not record any data until a minimum acceleration has been detected or in other words, that the device has been shaken with a certain amount of force. These detection features may be incorporated into the hardware of the IMU 260 itself in order to minimize power consumption. In response to the minimum acceleration being met, the IMU 260 may send a signal to the processors to indicate that the IMU is active (i.e. "on"). The processors 220 may then begin to receive and process feedback from the IMU 260. In other examples, one or both of the classifiers 410, 420 may be executed in hardware of the IMU and/or EOG. In this regard, after a trigger is recognized, the IMU 260 and/or EOG 250 may outputs a signal to a main processor identifying that the trigger has been met and/or a type of gesture. Thereafter, the processors may identify and perform the action associated with the type of gesture.

Figure 6:
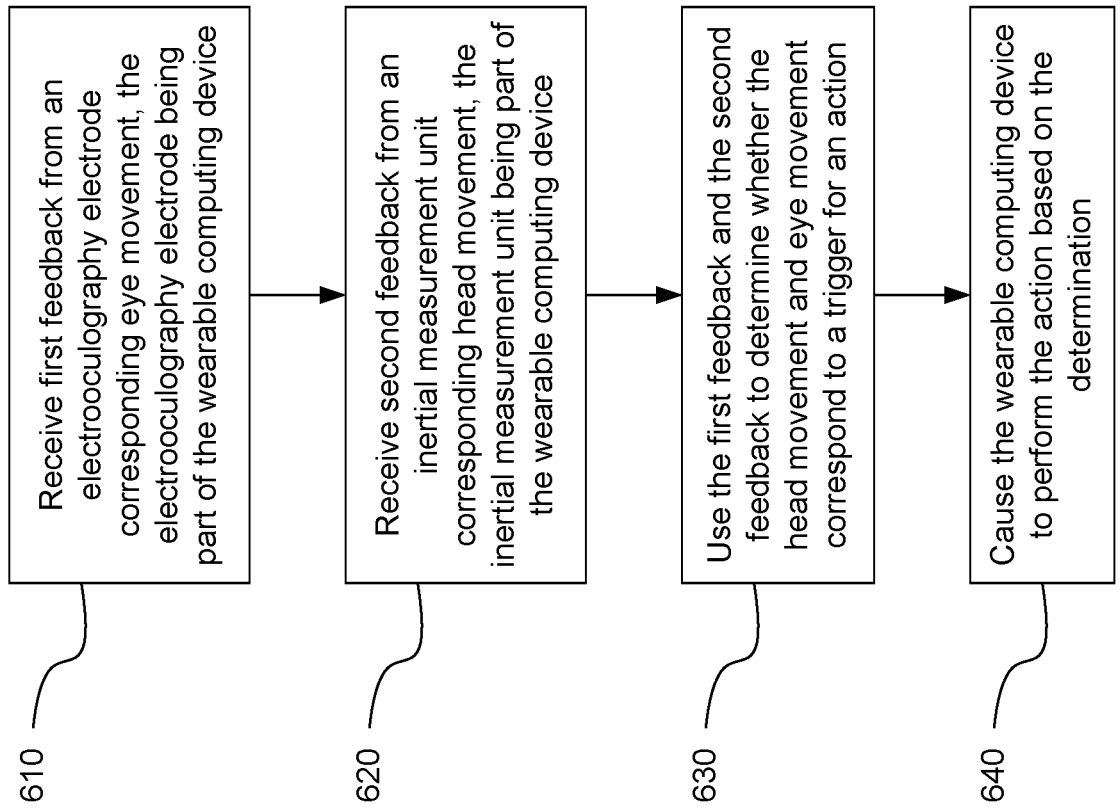
FIG. 6 is an example flow diagram of identifying and utilizing head and eye gestures in accordance with aspects of the disclosure.

FIG. 6 provides an example flow diagram for identifying and utilizing head and eye gestures, which may be performed by one or more processors of a wearable computing device 100, such as the one or more processors 220 of wearable computing device 100. In this example, at block 610, second feedback from an electrooculography electrode corresponding to eye movement is received. The electrooculography electrode is part of the wearable computing device. At block 620, second feedback from an inertial measurement unit corresponding to head movement is received. The inertial measurement unit is part of the wearable computing device and may include a gyroscope. At block 630, the first feedback and the second feedback are used to determine whether the head movement and eye movement correspond to a trigger for an action. At block 640, the wearable computing device is caused to perform the action based on the determination.

The features described herein may provide ways to recognize gestures and commands while using very little computing resources. In addition, the features described herein may significantly decrease the probability of false positives, reduces power consumption and is faster at recognizing gestures than camera-based approaches to recognizing gestures such as those that would require an internal-facing camera for recognizing electrooculography which can have high battery costs. Other efforts to investigate gaze-based gestures, focus on the idea of synchronizing eye movements to a moving stimulus. In this case, the eye is moving in a smooth pursuits fashion. However, for a typical person, leveraging the VOR requires less mental load than the smooth pursuits due to the reflexive nature of VOR.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A wearable device configured to detect a user's head and eye movement, the wearable device comprising:
    a body configured to be worn by the user;
    a first sensor coupled to the body and positioned to receive first feedback corresponding to a first movement of at least one of the user's eyes;
    a second sensor coupled to the body and positioned to receive second feedback corresponding to a second movement of the user's head;
    a processor operably couplable to the first sensor and the second sensor; and
    a non-transitory computer-readable medium having instructions that, when executed by the processor, cause the processor to—
        determine, using a first classifier and based at least partially on the first feedback and the second feedback, whether the first movement and the second movement correspond to an indication of a gesture performed by the user;
        determine, using a second classifier and based at least partially on the first feedback and the second feedback, the gesture performed by the user; and
        perform an action associated with the gesture.

2. The wearable device of claim 1 wherein the first sensor includes at least one electrooculography electrode.

3. The wearable device of claim 2 wherein the first feedback includes an electrical signal associated with the first movement.

4. The wearable device of claim 1 wherein the second sensor includes an inertial measurement unit.

5. The wearable device of claim 4 wherein the second feedback includes an angular velocity associated with (i) a first rotation of the user's head about a yaw axis of the user's head, (ii) a second rotation of the user's head about a pitch axis of the user's head, and/or (iii) a third rotation of the user's head about a roll axis of the user's head.

6. The wearable device of claim 4 wherein the inertial measurement unit includes a gyroscope.

7. The wearable device of claim 1 wherein the first classifier is configured to determine that the first movement and the second movement correspond to the indication of the gesture when the first movement and the second movement are in different directions.

8. The wearable device of claim 1 wherein the body includes at least one earpiece configured to be worn at least partially on or in an ear of the user.

9. The wearable device of claim 8 wherein the first sensor is positioned to receive the first feedback via an ear canal of the user's ear.

10. The wearable device of claim 1 wherein the first classifier is configured to compare the first feedback with the second feedback to determine whether the first movement corresponds to a vestibulo-ocular reflex of the at least one of the user's eyes.

11. The wearable device of claim 1 wherein the second movement includes at least one of (i) a first rotation of the user's head about a yaw axis of the user's head, (ii) a second rotation of the user's head about a pitch axis of the user's head, and/or (iii) a third rotation of the user's head about a roll axis of the user's head, and wherein the second classifier is configured to identify the second movement based at least partially on the second feedback.

12. A method for controlling a wearable device with a user's head and eye movements, the method comprising:
   receiving, by one or more processors of the wearable device, first feedback from a first sensor of the wearable device, the first feedback corresponding to a first movement of at least one of the user's eyes;
   receiving, by the one or more processors, second feedback from a second sensor of the wearable device, the second feedback corresponding to a second movement of the user's head;
   using a first classifier to determine, based at least partially on the first feedback and the second feedback, whether the first movement and the second movement correspond to an indication of a gesture performed by the user;
   using a second classifier to determine, based at least partially on the first feedback and the second feedback, the gesture performed by the user; and
   causing, by the one or more processors, the wearable device to perform an action associated with the gesture.

13. The method of claim 12 wherein the indication of the gesture includes a trigger for the gesture, and wherein using the first classifier includes using the first classifier to determine, based at least partially on the first feedback and the second feedback, whether the first movement and the second movement correspond to the trigger for the gesture.

14. The method of claim 13 wherein using the first classifier to determine whether the first movement and the second movement correspond to the trigger includes comparing the first feedback and the second feedback to determine whether the first movement corresponds to a vestibulo-ocular reflex of the user.

15. The method of claim 12, further comprising determining one or more values based at least partially on the first feedback and/or the second feedback, wherein using the first classifier includes applying the first classifier to the one or more values.

16. The method of claim 15 wherein determining the one or more values includes determining at least one of a Pearson correlation, a cross correlation, and/or a delta peak timing based at least partially on the first feedback and/or the second feedback.

17. The method of claim 16 wherein using the second classifier includes applying the second classifier to individual ones of the one or more values when the first classifier determines the first movement and the second movement correspond to the indication of the gesture.

18. The method of claim 12 wherein the first sensor includes an electrooculography electrode positioned to receive an electrical signal associated with movement of at least one of the user's eyes, and wherein receiving the first feedback includes receiving the electrical signal via the electrooculography electrode.

19. The method of claim 12 wherein the second sensor includes an inertial measurement unit positioned to detect at least one of (i) a first rotation of the user's head about a yaw axis of the user's head, (ii) a second rotation of the user's head about a pitch axis of the user's head, and/or (iii) a third rotation of the user's head about a roll axis of the user's head, and wherein receiving the second feedback includes receiving an input from the inertial measurement unit that corresponds to at least one of the first rotation, the second rotation, and/or the third rotation.

20. A method for identifying a user's head and eye gestures with a wearable device, the method comprising:
   programming the wearable device to receive, via one or more processors of the wearable device—
      first feedback from a first sensor of the wearable device, the first feedback corresponding to a first movement of at least one of the user's eyes, and
      second feedback from a second sensor of the wearable device, the second feedback corresponding to a second movement of the user's head;
   programming a first classifier of the wearable device to determine, via the one or more processors and based at least partially on the first and the second feedback, whether the first movement and the second movement correspond to an indication of a gesture performed by the user;
   programming a second classifier of the wearable device to determine, via the one or more processors and based at least partially on the first and the second feedback, the gesture performed by the user; and
   programming the wearable device to perform an action associated with the gesture.

* * * * *